United States Patent
Han et al.

(10) Patent No.: US 10,570,024 B2
(45) Date of Patent: Feb. 25, 2020

(54) METHOD FOR EFFLUENT TOTAL NITROGEN-BASED ON A RECURRENT SELF-ORGANIZING RBF NEURAL NETWORK

(71) Applicant: Beijing University of Technology, Beijing (CN)

(72) Inventors: Honggui Han, Beijing (CN); Yanan Guo, Beijing (CN); Junfei Qiao, Beijing (CN)

(73) Assignee: Beijing University of Technology, Beijing (CN)

( * ) Notice: Subject to any disclaimer, the term of this patent is extended or adjusted under 35 U.S.C. 154(b) by 494 days.

(21) Appl. No.: 15/389,755

(22) Filed: Dec. 23, 2016

(65) Prior Publication Data
US 2018/0029900 A1    Feb. 1, 2018

(30) Foreign Application Priority Data
Jul. 28, 2016   (CN) .......................... 2016 1 0606146

(51) Int. Cl.
*C02F 1/00*    (2006.01)
*C02F 3/00*    (2006.01)
(Continued)

(52) U.S. Cl.
CPC .............. *C02F 1/008* (2013.01); *C02F 3/006* (2013.01); *G06N 3/0445* (2013.01); *G06N 3/0481* (2013.01); *G06N 3/08* (2013.01); *G06N 3/082* (2013.01); *G06N 3/088* (2013.01); *C02F 2101/16* (2013.01); *C02F 2209/003* (2013.01); *C02F 2209/08* (2013.01); *C02F 2209/14* (2013.01); *C02F 2209/15* (2013.01); *C02F 2209/16* (2013.01); *C02F 2209/18* (2013.01)

(58) Field of Classification Search
CPC ................ C02F 3/00; C02F 1/00; G06N 3/02
See application file for complete search history.

(56) References Cited

PUBLICATIONS

Han, H-G., et al., "Model predictive control of dissolved oxygen concentration based on a self-organizing RBF neural network", 2012, Control Engineering Practice 20 (2012), p. 465-476 (Year: 2012).*

(Continued)

*Primary Examiner* — Kakali Chaki
*Assistant Examiner* — Nader Metwalli
(74) *Attorney, Agent, or Firm* — Zhihua Han; Wen IP LLC

(57) ABSTRACT

In this present disclosure, a computing implemented method is designed for predicting the effluent total nitrogen concentration (TN) in an urban wastewater treatment process (WWTP). The technology of this present disclosure is part of advanced manufacturing technology and belongs to both the field of control engineer and environment engineer. To improve the predicting efficiency, a recurrent self-organizing radial basis function (RBF) neural network (RSORBFNN) can adjust the structure and parameters simultaneously. This RSORBFNN is developed to implement this method, and then the proposed RSORBFNN-based method can predict the effluent TN concentration with acceptable accuracy. Moreover, online information of effluent TN concentration may be predicted by this computing implemented method to enhance the quality monitoring level to alleviate the current situation of wastewater and to strengthen the management of WWTP.

1 Claim, 5 Drawing Sheets

(51) Int. Cl.
*G06N 3/08* (2006.01)
*G06N 3/04* (2006.01)
*C02F 101/16* (2006.01)

(56) References Cited

PUBLICATIONS

Han, H-G., et al., "Nonlinear Model Predictive Control Based on a Self-Organizing Recurrent Neural Network", 2016, IEEE Transactions on Neural Networks and Learning Systems, vol. 27, No. 2, Feb. 2016 (Year: 2016).*
Yu, H., et al., "Advantages of Radial Basis Function Networks for Dynamic System Design", 2011, IEEE Transactions on Industrial Electronics, vol. 58, No. 12, Dec. 2011 (Year: 2011).*
Chen, J. C., et al., "Assessing wastewater reclamation potential by neural network model", 2003, Engineering Applications of Artificial Intelligence 16 (2003), p. 149-157 (Year: 2003).*
Whitehead, B. A., et al., "Cooperative-Competitive Genetic Evolution of Radial Basis Function Centers and Widths for Time Series Prediction", 1996, IEEE Transactions on Neural Networks, vol. I, No. 4, Jul. 1996 (Year: 1996).*
S. E. Fahlman and C. Lebiere, "The cascade-correlation learning architecture,", 1991,Advances in Neural Information Processing Systems 2, 1991, pp. 524-532. (Year: 1991).*

* cited by examiner

METHOD FOR EFFLUENT TOTAL NITROGEN-BASED ON A RECURRENT SELF-ORGANIZING RBF NEURAL NETWORK

CROSS REFERENCE TO RELATED PATENT APPLICATIONS

This application claims priority to Chinese Patent Application No. 201610606146.X, filed on Jul. 28, 2016, entitled "a method for effluent total nitrogen based on a recurrent self-organizing RBF neural network," which is hereby incorporated by reference in its entirety.

TECHNICAL FIELD

In this present disclosure, a computing implemented method is designed for predicting the effluent total nitrogen TN concentration (TN) in the urban wastewater treatment process (WWTP) by a recurrent self-organizing radial basis function (RBF) neural network (RSORBFNN). To improve the measurement efficiency, the RSORBFNN can adjust the structure and parameters concurrently: a growing and pruning algorithm is proposed to design the structure, and an adaptive second-order algorithm is utilized to train the parameters. The technology of this present disclosure is part of advanced manufacturing technology and belongs to both the field of control engineer and environment engineering.

BACKGROUND

The urban WWTP not only guarantees the reliability and stability of the wastewater treatment system but also meets the water quality national discharge standard. However, the influence factors are various for effluent TN concentration of wastewater treatment process and the relationship between different influencing factors are complex. Therefore, it is hard to make real-time detecting for effluent TN concentration, which seriously affected the stable operation of the urban WWTP. The computing implemented method for effluent TN concentration, based on RSORBFNN, is helpful to improve the efficiency, strengthen delicacy management and ensure water quality effluent standards of urban WWTP. It has better economic benefit as well as significant environmental and social benefits. Thus, the research achievements have wide application prospect in this present disclosure.

The control target of urban WWTP is to make the water quality meet the national discharge standards, mainly related to the parameters of effluent TN concentration, chemical oxygen demand (COD), effluent suspended solids (SS), ammonia nitrogen (NH4-N), biochemical oxygen demand (BOD) and effluent total phosphorus (TP). Effluent TN concentration refers to the sum of all the nitrogen pollution of the water after dealing with the sewage treatment plant process facilities, mainly for the ammonia nitrogen, nitrate nitrogen, inorganic nitrogen, protein, amino acid and organic amine organic nitrogen combined. According to statistics, nitrogen fixation rate of about 150 million tons per year in nature and chemical nitrogen fertilizer production rate of about 5000~6000 tons a year. If nature denitrification reaction failed to complete the nitrogen cycle, too much nitrogen compounds and the ammonia nitrogen nutrient caused a significant number of algae in the water, the plants breeding, appearance of eutrophication status. To curb the trend of worsening of water environment, many sewage treatment facilities have spent a large sum of money to build and put into operation in the country, the cities, and towns. The general method for determination is the alkaline potassium persulfate UV spectrophotometry and molecular absorption spectrometry. However, the determination of total nitrogen TN is often offline and can't realize the effluent TN concentration real-time measurement, which led directly to the sewage treatment process is hard to achieve closed loop control. Moreover, it is a big challenge for detection due to a significant amount of pollutants in wastewater and different content. Developing new hardware measuring instrument, although directly solving various wastewater treatment process variables and the detection problem of water quality parameters, due to the very complex organic matter in sewage, research and development of the new sensor will be a significant cost and a time-consuming project. Hence, the new method presented to solve the problem of the real-time measurement of the process parameters of WWTP has become an important topic to research in the field of wastewater control engineering and has important practical significance.

To obtain more reliable information on effluent TN concentration in urban WWTP, we have investigated a computing implemented method based on the RSORBFNN. The neural network uses competitiveness of the hidden neuron to determine whether to add or delete the hidden neurons and to use an adaptive second order algorithm to ensure the accuracy of RSORBFNN. The objective of this present disclosure is to develop a computing implemented method for estimating the effluent TN concentration online and with high precision.

SUMMARY

A computing implemented method is designed for the effluent TN concentration prediction based on an RSORBFNN in this present disclosure. For this computing implemented method, the inputs are those variables that are easy to measure and the outputs are estimates of the effluent TN concentration. By constructing the RSORBFNN, it realizes the mapping between auxiliary variables and effluent TN concentration. Also, the method can obtain a real-time measurement of effluent TN concentration, solve the problems of long measurement cycle for effluent TN concentration.

A computing implemented method for the effluent TN concentration based on an RSORBFNN, its characteristic and steps include the following steps:

(1) Determine the input and output variables of effluent TN concentration:

effluent TN concentrationeffluent TN concentration(2) Initialize RSORBFNN effluent TN concentration (3) Train RSORBFNN (17)

(4) Effluent TN concentration concentration prediction;

The testing samples are used as the input of RSORBFNN, the output of RSORBFNN is the soft-computing values of effluent TN concentration.

The Novelties of this Present Disclosure Contain:

(1) To detect the effluent TN concentration online and with acceptable accuracy, a computing implemented method is developed in this present disclosure. The results demonstrate that the effluent TN concentration trends in WWTP can be predicted with acceptable accuracy using the $NH_4$—N, $NO_3$—N, effluent SS, BOD, TP as input variables. This computing implemented method can predict the effluent TN concentration with acceptable accuracy and solve the problem that the effluent TN concentration's hard to be measured online.

(2) Since wastewater treatment process has the features of a complicated mechanism, and many influential factors, it was difficult to build a precise mathematical model to predict the effluent TN concentration. Hence, the computing implemented method is based on the RSORBFNN in this present disclosure, which is proposed to predict it. The advantages of the proposed RSORBFNN are that it can simplify and accelerate the structure optimization process of the recurrent neural network, and can predict the effluent TN concentration accurately. Moreover, the predicting performance shows that the RSORBFNN-based computing implemented method can adapt well to environment change. Therefore, this computing implemented method performs well in the whole operating space.

Attention: this present disclosure utilizes five input variables in this RSORBFNN method to predict the effluent TN concentration. In fact, it is in the scope of this present disclosure that any of the variables: the $NH_4$—N, $NO_3$—N, effluent SS, BOD, TP are used to predict the effluent TN concentration. Moreover, this RSORBFNN method is also able to predict the other variables in urban WWTP.

DETAILED DESCRIPTION

Figure 1:
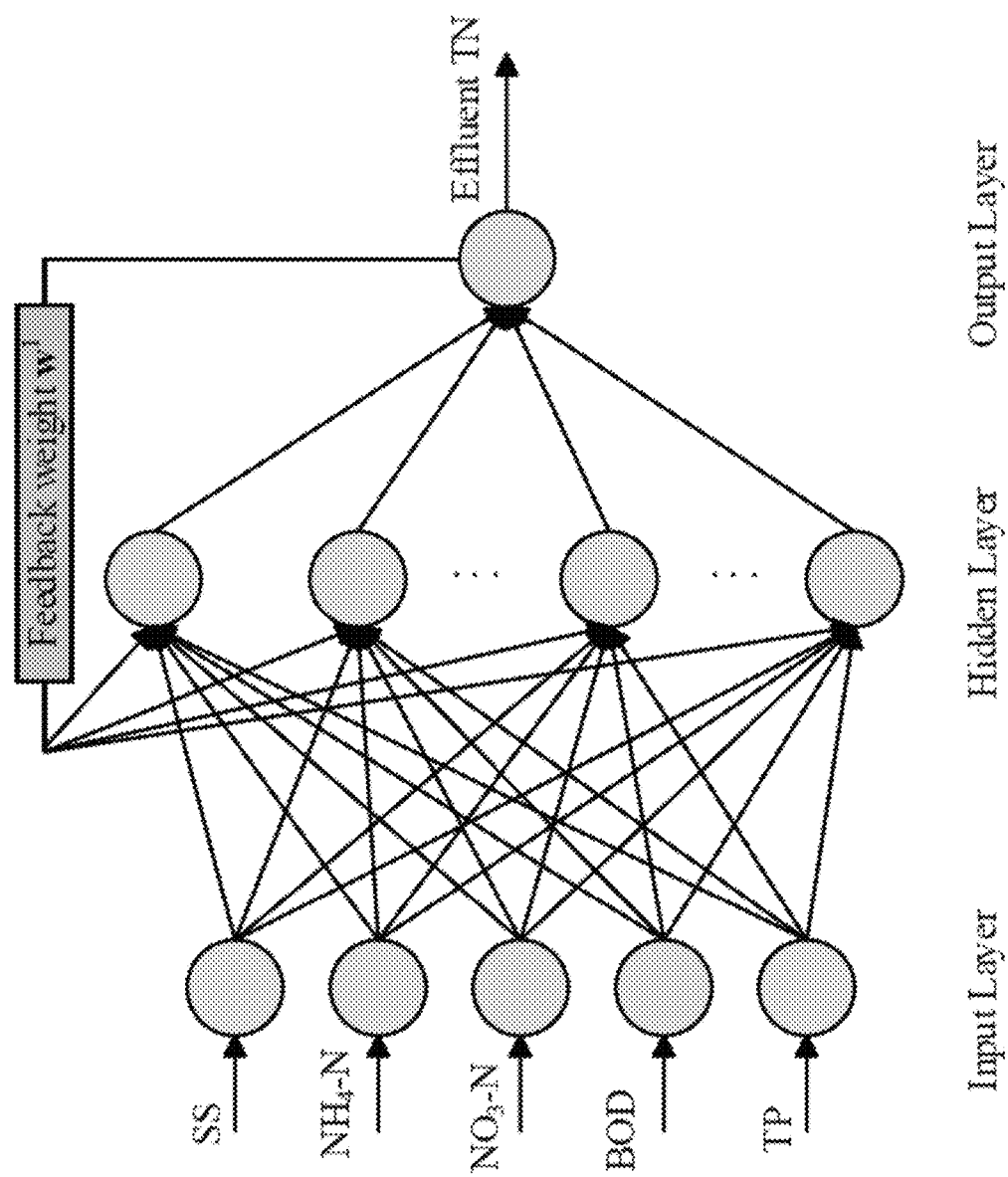
FIG. 1 shows the structure of computing implemented method based on the RSORBFNN in this present disclosure.

A computing implemented method is developed to predict the effluent TN concentration based on an RSORBFNN in this present disclosure. For this computing implemented method, the inputs are those variables that are easy to measure and the outputs are estimates of the effluent TN concentration. In general, the procedure of computing implemented method consists of three parts: data acquisition, data pre-processing and model design. For this present disclosure, an experimental hardware is set up as shown in FIG. 1. The historical process data are routinely acquired and stored in the data acquisition system. The input-output water quality data can be easily retrieved, measured during the year 2011. The variables whose data are easy to measure by the instruments consist of $NH_4$—N, $NO_3$—N, effluent SS, BOD, TP and effluent TN concentration were used as experimental samples. After deleting abnormal data, 100 groups were obtained and normalized, 60 groups were used as training data, whilst the remaining 40 were used as testing data.

This present disclosure adopts the following technical scheme and implementation steps:

A computing implemented method for the effluent TN concentration based on an RSORBFNN, its characteristic and steps include the following steps:

(1) Determine the input and output variables of effluent TN concentration:

For sewage treatment process of activated sludge system, the variables of sewage treatment process are analyzed and select the input variables of effluent TN concentration soft-computing model: ammonia nitrogen—$NH_4$—N, nitrate nitrogen—$NO_3$—N, effluent suspended solids—SS, biochemical oxygen demand—BOD, total phosphorus—TP, The output value of soft-computing model is detected effluent TN concentration.

(2) Initialize RSORBFNN

The initial structure of RSORBFNN consists of three layers: input layer, hidden layer, and output layer. There are 5 neurons in the input layer, J neurons in the hidden layer and 1 neuron in the output layer; J>2 is a positive integer. Connection weights between input layer and hidden layer are assigned 1, the feedback weights between hidden layer and output layer randomly assign values, the assignment interval is to 1; the number of the training sample is P, and the input vector of RSORBFNN is $x(t)=[x_1(t), x_2(t), x_3(t), x_4(t), x_5(t)]$ at time t; y(t) is the output of RSORBFNN, and $y_d(t)$ is the real value of effluent TN concentration at time t, respectively; The output of RSORBFNN can be described:

$$y(t) = \sum_{j=1}^{J} w_j^2(t)\theta_j(t), \quad (1)$$

wherein $w^2_j(t)$ is the output weight between the jth hidden neuron and the output neuron, $w^2(t)=[w2\ 1(t), w2$ $2(t), \ldots, w2\ J(t)]^T$ is the output weight vector between hidden neurons and output neuron, j=1, 2, ..., J, J is the number of hidden neurons, and $\theta_j(t)$ is the output value of the jth hidden neuron which is usually defined by a normalized Gaussian function:

$$\theta_j(t) = e^{-\|h_j(t)-c_j(t)\|^2/2\sigma_j^2(t)}, \tag{2}$$

wherein $\|h_j-c_j\|$ represents the Euclidean distance between $h_j$ and $c_j$, $c_j(t)=[c_{1j}(t), c_{2j}(t), \ldots, c_{5j}(t)]^T$ and $\sigma_j$ represent the center vector and radius of the jth hidden neuron, respectively; $c_{ij}(t)$ is ith element of jth hidden neuron, and $h_j$ is the input vector of jth hidden neuron $$h_j(t)=[u_1(t),u_2(t),u_3(t),u_4(t),u_5(t),w_j^1(t)\times y(t-1)] \tag{3}$$

wherein y(t-1) is the output from RSORBFNN at (t-1) time, w1 j(t) is the feedback weight connecting the jth neuron in the hidden layer hidden with the output neuron, $w^1(t)=[w1\ 1(t), w1\ 2(t), \ldots, w1\ J(t)]^T$ is the feedback weight between the output neuron and the hidden layer neuron, T means to transpose.

The output of the output layer is:

$$y(t) = \sum_{j=1}^{J} w_j^2(t) \times \theta_j(t),\ j = 1, \ldots, J \tag{4}$$

wherein $w^2(t)=[w2\ 1(t), w2\ 2(t), \ldots, w2\ J(t)]^T$ is the weight vector connecting the hidden layer and the output layer at time t, w2j(t) is the weight connecting the hidden layer and the output layer at time t, $\theta(t)=[\vartheta_1(t), \vartheta_2(t), \ldots, \vartheta_J(t)]^T$ is the output vector of the hidden layer at time t, $\vartheta_j(t)$ is the output of the hidden layer neuron j at time t, and y(t) is the output of the RSORBFNN at time t.

The training error function of RSORBFNN is defined $$E(t) = \frac{1}{P}\sum_{t=1}^{P}(y_d(t) - y(t))^2, \tag{5}$$

wherein P is the number of the training samples.

(3) Train RSORBFNN

1) Given RSORBFNN, the initial number of hidden layer neurons is J; J>2 is a positive integer. The input of RSORBFNN is x(1), x(2), ..., x(t), ..., x(P), the desired output is $y_d(1), y_d(2), \ldots, y_d(t), \ldots, y_d(P)$; the desired error value is set to $E_d$, $E_d \in (0, 0.01)$, the initial center is CJ(1) $\in (-2, 2)$, the initial width value $\sigma_j(1) \in (0, 1)$, the initial feedback weight is w1 j(1)$\in(0, 1)$, and the initial weight is w2j(1)$\in(0, 1)$, j=1, 2, ..., J;

2) Set the learning step s=1;

3) t=s, calculate the output y(t) of RSORBFNN, update the weight, width, and center of RSORBFNN using the rule:

$$\Theta(t+1)=\Theta(t)+(\Psi(t)+\eta(t)\times I)^{-1}\times \Omega(t), \tag{6}$$

where $\Theta(t)=[w^1(t),w^2(t),C(t),\sigma(t)]$ is the variable vector at time t, $\psi(t)$ is quasi Hessian matrix at time t, I is the identity matrix, $\eta(t)$ is the adaptive learning rate defined as:

$$\eta(t) = \mu(t)\eta(t-1), \tag{7}$$

$$\mu(t) = \frac{(\beta^{max}(t)+\eta(t-1))/(1+\beta^{max}(t-1))-\beta^{min}(t-1)}{\eta(t-1)}, \tag{8}$$

wherein $\mu(t)$ is the adapting factor at time t, and the initial value of $\mu(t)$ is $\mu(1)=1$, $\beta^{max}(t)$ and $\beta^{min}(t)$ are the maximum and minimum eigenvalues of $\psi(t)$, respectively; $0<\beta^{min}(t)<\beta^{max}(t)$, $0<\eta(t)<1$ and $\eta(1)=1$. $\Theta(t)$ contains four kinds of variables: the feedback connection weight vector $w^1(t)$ at time t, the connection weight vector $w^2(t)$ at time t, the centre matrix $C(t)=[c_1(t), c_2(t), \ldots, c_j(t)]^T$ and width vector $\sigma(t)=[\sigma_1(t), \sigma_2(t), \ldots, \sigma_j(t)]^T$ at time t.

$$\Theta(1)=[w^1(1),w^2(1),C(1),\sigma(1)], \tag{9}$$

the quasi Hessian matrix $\psi(t)$ and the gradient vector $\Omega(t)$ are accumulated as the sum of related submatrices and vectors:

$$\Psi(t)=j^T(t)j(t), \tag{10}$$

$$\Omega(t)=j^Te(t), \tag{11}$$

$$e(t)=y_d(t)-y(t), \tag{12}$$

e(t) is the approximating error at time t, $y_d(t)$ is the desired output and y(t) is the network output at time t, and the Jacobian-vector j(t) is calculated as:

$$j(t) = \left[\frac{\partial e(t)}{\partial w^1(t)}, \frac{\partial e(t)}{\partial w^2(t)}, \frac{\partial e(t)}{\partial C(t)}, \frac{\partial e(t)}{\partial \sigma(t)}\right], \tag{13}$$

4) t>3, calculate competitiveness of the jth hidden neuron:

$$cp_j(t)=\rho f_j(t)\sigma_j(t), j=1,2,\ldots,J, \tag{14}$$

wherein $cp_j(t)$ is the competitiveness of the jth hidden neuron, $\rho$ denotes the correlation coefficient between the hidden layer output and network output, $\rho \in (0, 1)$, $f_i(t)$ is the active state of the jth hidden neuron, $\sigma_j(t)$ is the width of the jth hidden neuron; the active state $f_j(t)$ is defined as $$f_j(t)=\chi^{-v\|h_j(t)-e_j(t)\|}, \tag{15}$$

wherein $\chi \in (1,2)$, and $f(t)=[f_1(t), f_2(t), \ldots, f_j(t)]$, the correlation coefficient $\rho_j(t)$ at time t is calculated as $$\rho_j(t) = \frac{\sum_{k=0}^{3}[A_j(t-k)-\overline{A}(t)][B(t-k)-\overline{B}(t)]}{\sqrt{\sum_{k=0}^{3}[A_j(t-k)-\overline{A}(t)]^2 \sum_{k=0}^{3}[B(t-k)-\overline{B}(t)]^2}}, \tag{16}$$

wherein the correlation coefficient of hidden neurons $A_j(t)=w2\ j(t)\theta_j(t)$, the correlation coefficient of output layer $B(t)=y(t)$, $\overline{A}(t)$ is the average value of correlation coefficient of hidden neurons at time t, $\overline{B}(t)$ is the average value of correlation coefficient of output layer at time t;

5) Adjust the structure of RSORBFNN:

If the competitiveness of the jth hidden neuron and training error at time t and t+τ satisfy $$E(t) - E(t + \tau) \leq \varepsilon, \quad (17)$$

$$j = \arg\max_{1 \leq j \leq J} (cp_j(t)), \quad (18)$$

wherein $$\arg\max_{1 \leq j \leq J} (cp_j(t))$$

denotes the value of j when $cp_j(t)$ obtain the maximum value. E(t) and E(t+τ) are the training errors at times t and t+τ, respectively, τ is a time interval, τ=5, and ε is the preset threshold, ε=0.001. Add one hidden neuron, and the number of hidden neurons is $M_1=J+1$. Otherwise, the structure of RSORBFNN will not be adjusted, $M_1=J$.

When the competitiveness of the jth hidden neuron satisfies $$cp_j(t) < \xi \quad (19)$$

wherein ξ is the preset pruning threshold, $\xi \in (0, E_d)$, $E_d$ is the preset error, $E_d=0.002$. The jth hidden neuron will be pruned, the number of hidden neurons will be updated $M_2=M_1-1$. Otherwise, the structure of RSORBFNN will not be adjusted, $M_2=M_1$.

6) Increase 1 learning step for s, if s<P, go to step 3); if s=N, proceed to step 7).

7) According to Eq. (24), calculate the performance of RSORBFNN. If $E(t) \geq E_d$, proceed to step 3); if $E(t) < E_d$, stop the training process.

Figure 2:
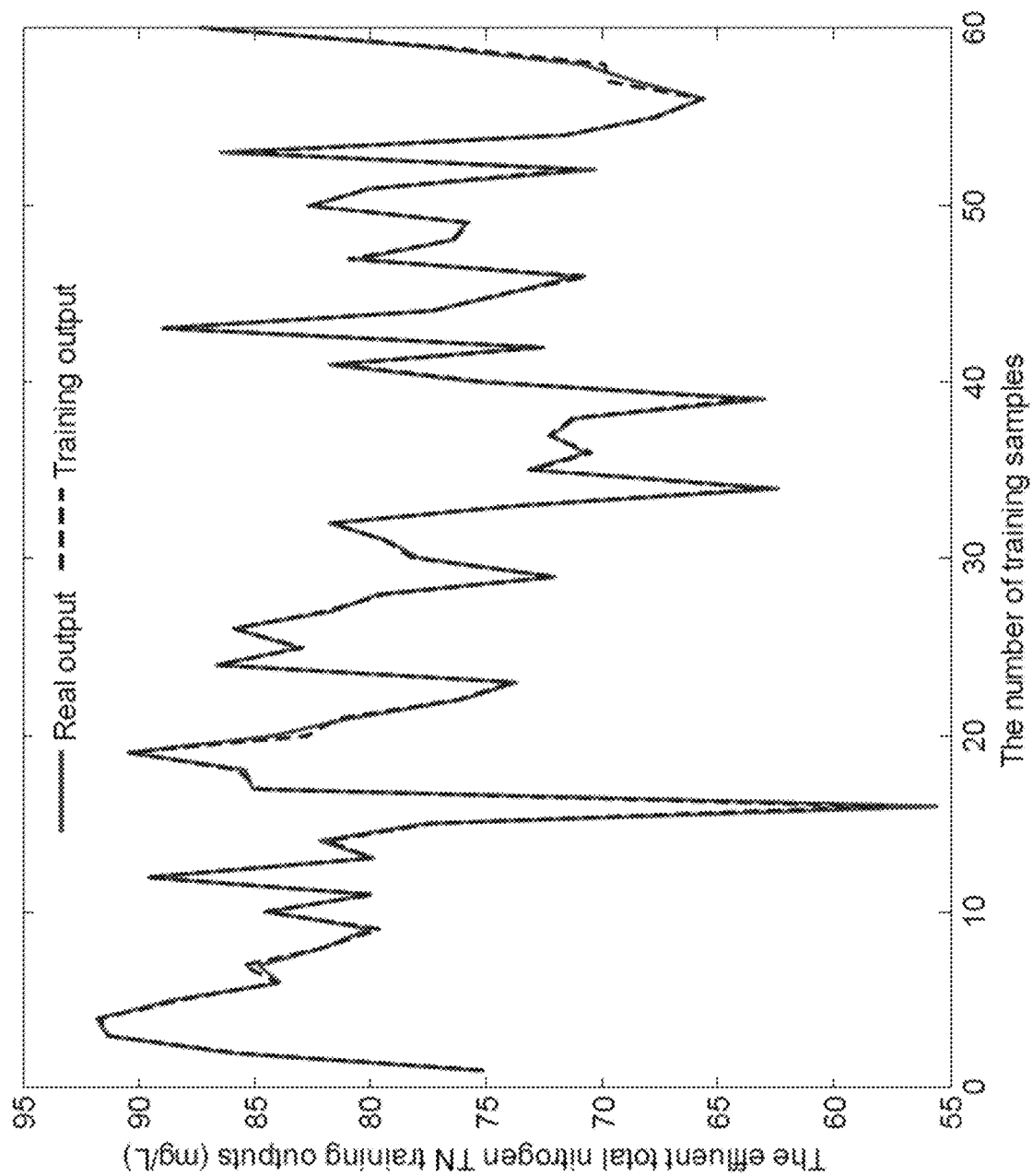
FIG. 2 shows the training result of the computing implemented method.
Figure 3:
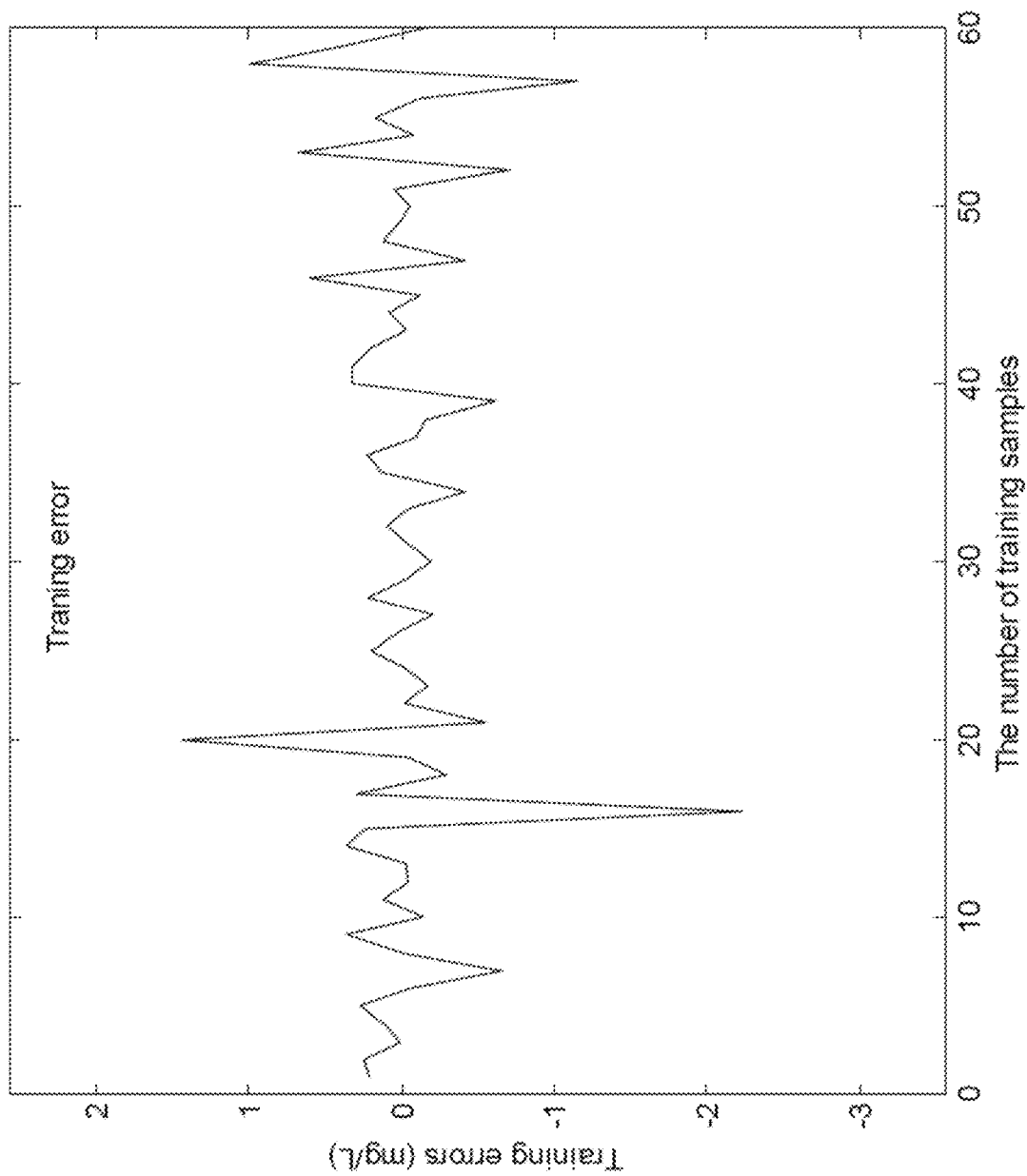
FIG. 3 shows the training error of the computing implemented method.

The training result of the computing implemented method for effluent TN concentration is shown in FIG. 2. X-axis indicates the number of samples. Y axis shows the effluent TN concentration. The unit of Y axis is mg/L. The solid line presents the real values of effluent TN concentration. The dotted line shows the outputs of computing implemented method in the training process. The errors between the true values and the outputs of intelligent detecting method in the training process are shown in FIG. 3. X-axis indicates the number of samples. Y axis shows the training error. The unit of Y axis is mg/L.

Figure 4:
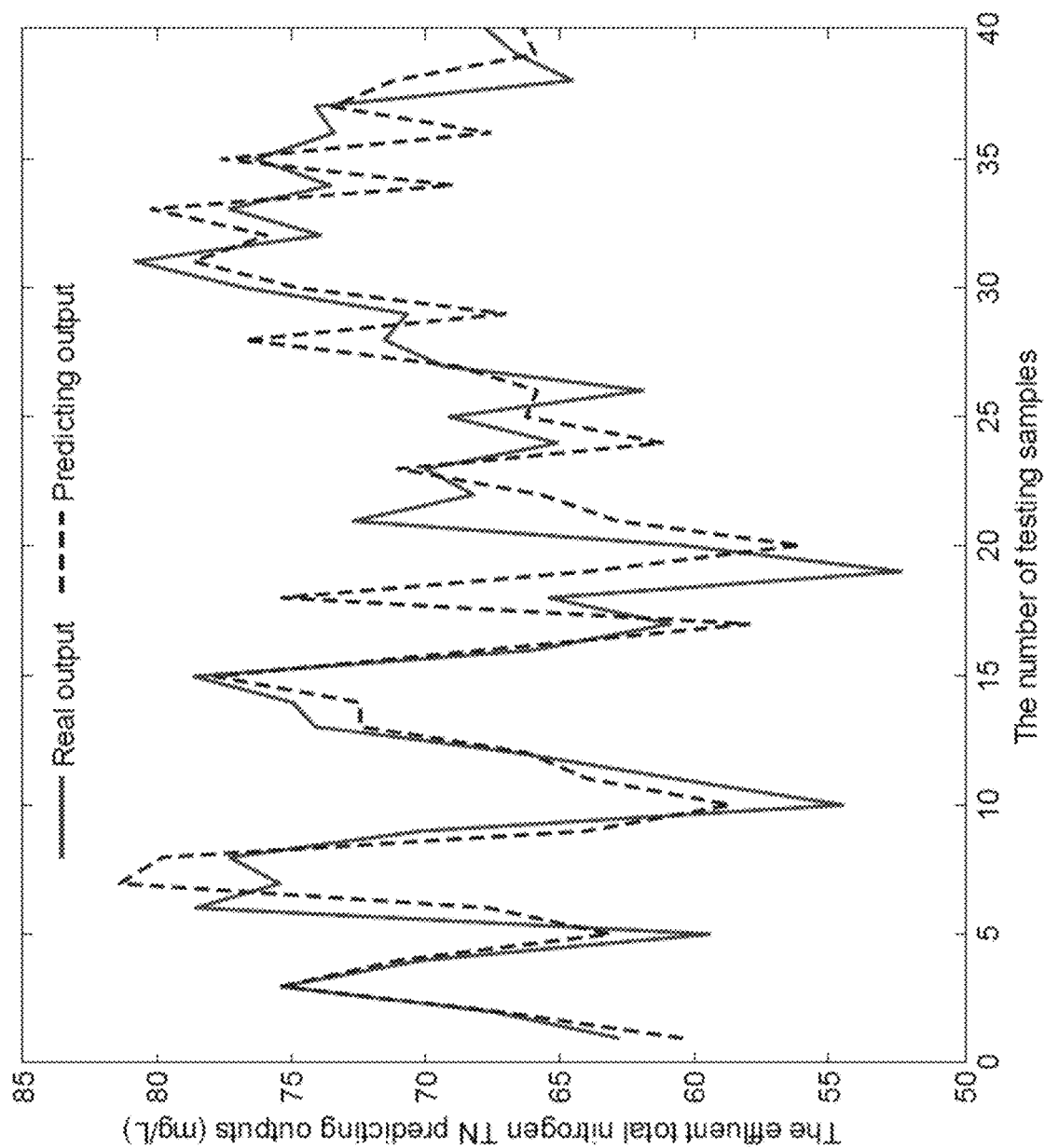
FIG. 4 shows the predicting result of the computing implemented method.
Figure 5:
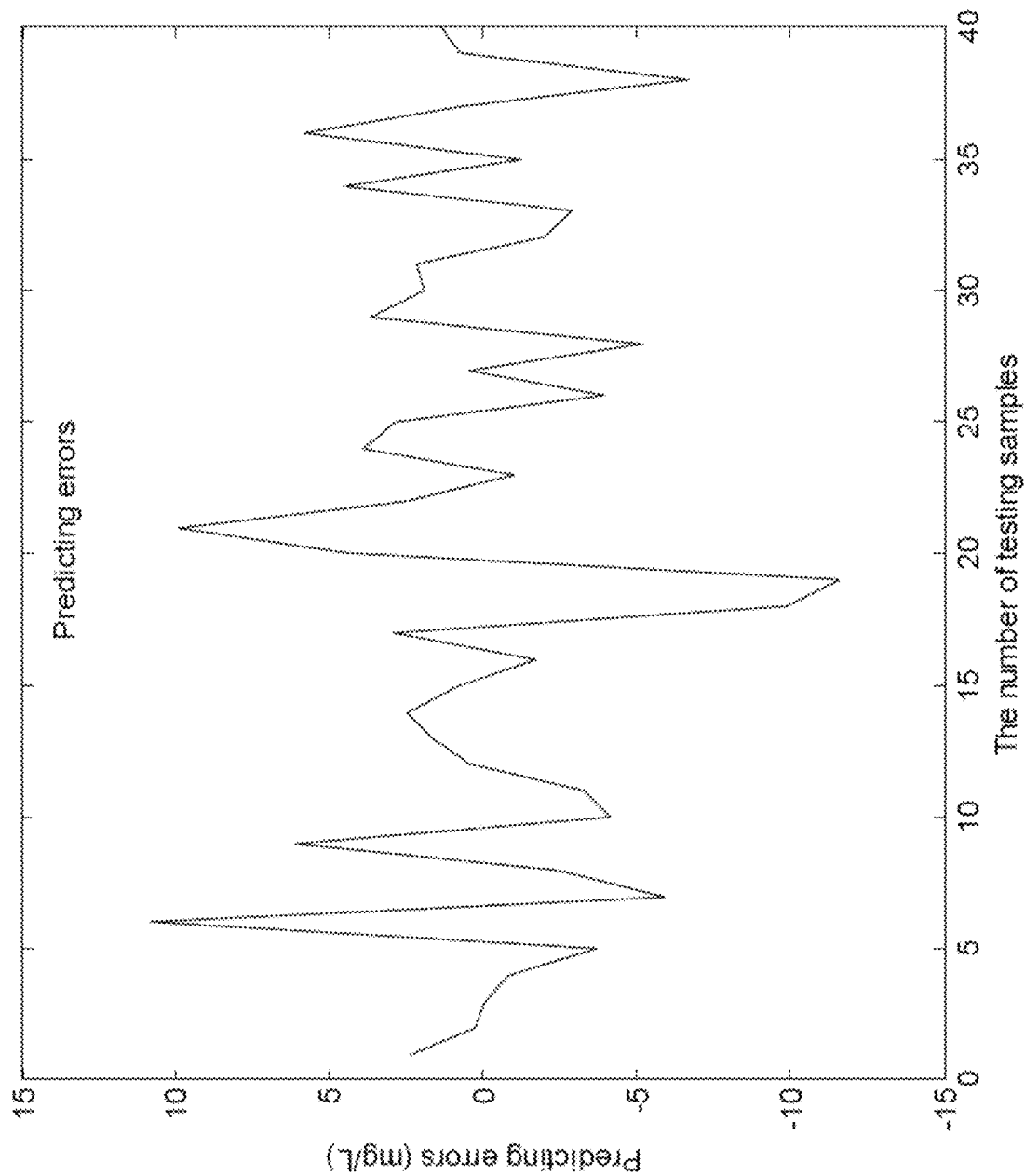
FIG. 5 shows the predicting error of the computing implemented method.

(4) Effluent TN concentration concentration prediction;

The testing samples are used as the input of RSORBFNN, and the output of RSORBFNN is the soft-computing values of effluent TN concentration. The predicting result is shown in FIG. 4. X-axis indicates the number of testing samples. Y axis shows the effluent TN concentration. The unit of Y axis is mg/L. The solid line presents the real values of effluent TN concentration. The dotted line shows the outputs of intelligent detecting method in the testing process. The errors between the true values and the outputs of intelligent detecting method in the testing process are shown in FIG. 5. X-axis shows the number of samples. Y axis shows the testing error. The unit of Y axis is mg/L.

Tables 1-14 show the experimental data in this present disclosure. Tables 1-6 show the training samples of biochemical oxygen demand—BOD, ammonia nitrogen—$NH_4$—N, nitrate nitrogen—$NO_3$—N, effluent suspended solids—SS, total phosphorus—TP real effluent TN concentration. Table 7 shows the outputs of the RSORBFNN in the training process. Tables 8-14 show the testing samples of biochemical oxygen demand—BOD, ammonia nitrogen—$NH_4$—N, nitrate nitrogen—$NO_3$—N, effluent suspended solids—SS, total phosphorus—TP and real effluent TN concentration. Table 14 shows the outputs of the RSORBFNN in the predicting process Training samples are provided as follow.

TABLE 1

The training samples of biochemical oxygen demand-BOD (mg/L)

| 192 | 222 | 201 | 264 | 195 | 209 | 260 | 197 | 206 | 289 |
| 188 | 350 | 210 | 204 | 200 | 180 | 230 | 338 | 200 | 330 |
| 320 | 232 | 260 | 240 | 218 | 316 | 310 | 172 | 210 | 316 |
| 310 | 244 | 248 | 168 | 204 | 145 | 170 | 142 | 190 | 260 |
| 200 | 240 | 280 | 174 | 250 | 136 | 222 | 204 | 239 | 242 |
| 310 | 232 | 290 | 210 | 144 | 214 | 251 | 158 | 262 | 290 |

TABLE 2

The training samples of ammonia nitrogen-NH4—N (mg/L)

| 64.3 | 69.4 | 72.6 | 71.7 | 71.5 | 63.5 | 70.7 | 68.4 | 64.3 | 68.3 |
| 71.9 | 64.3 | 63.8 | 56.9 | 44.6 | 64.9 | 68.9 | 76.9 | 63.5 | 70 |
| 60.3 | 60 | 72.1 | 69.7 | 70.5 | 66.1 | 62.2 | 58.8 | 60.5 | 63.5 |
| 65.7 | 59.4 | 54.8 | 60 | 59.1 | 63.7 | 64.5 | 58.1 | 61.9 | 66.7 |
| 57.6 | 70.7 | 61.3 | 57.8 | 55.3 | 65.8 | 65.1 | 61.3 | 72 | 62.8 |
| 63.4 | 61.4 | 71.3 | 61.2 | 58.7 | 55.7 | 67.7 | 58.5 | 61.5 | 73.2 |

TABLE 3

The training samples of nitrate nitrogen-NO3—N (mg/L)

| 13.8325 | 13.7215 | 13.6408 | 13.6666 | 13.7288 | 13.8617 | 13.8873 | 13.9157 | 13.9758 | 14.1119 |
| 14.4164 | 14.4829 | 15.2031 | 15.2791 | 15.6909 | 16.1498 | 16.6379 | 16.9443 | 16.8975 | 16.8101 |
| 16.5498 | 16.2205 | 15.7517 | 15.3732 | 14.5885 | 13.9968 | 13.5851 | 12.9808 | 12.6256 | 12.2428 |
| 11.9133 | 11.6286 | 11.4642 | 10.7946 | 10.3934 | 10.4852 | 10.9491 | 11.5281 | 12.2201 | 12.8419 |
| 13.3324 | 13.0934 | 12.8794 | 12.9103 | 12.5906 | 12.3108 | 12.0798 | 11.9742 | 11.8102 | 11.6730 |
| 11.6093 | 11.4942 | 11.4940 | 11.5036 | 11.4617 | 11.4878 | 11.3927 | 11.3851 | 11.4866 | 11.7895 |

TABLE 4

The training samples of effluent suspended solids-SS (mg/L)

| | | | | | | | | | |
|---|---|---|---|---|---|---|---|---|---|
| 146 | 192 | 226 | 208 | 154 | 264 | 276 | 208 | 178 | 250 |
| 204 | 288 | 210 | 172 | 200 | 170 | 214 | 324 | 186 | 422 |
| 168 | 238 | 232 | 260 | 184 | 330 | 312 | 230 | 162 | 300 |
| 268 | 231 | 270 | 132 | 252 | 204 | 148 | 116 | 182 | 292 |
| 210 | 210 | 350 | 214 | 212 | 170 | 262 | 178 | 228 | 164 |
| 296 | 308 | 240 | 170 | 140 | 178 | 196 | 312 | 164 | 320 |

TABLE 5

The training samples of total phosphorus-TP (mg/L)

| | | | | | | | | | |
|---|---|---|---|---|---|---|---|---|---|
| 6.38 | 6.71 | 7.15 | 7.29 | 6.31 | 7.03 | 7.35 | 7.05 | 6.66 | 7.28 |
| 7.06 | 7.73 | 6.92 | 6.7 | 6.91 | 6.38 | 7.18 | 7.81 | 7.39 | 8.21 |
| 6.56 | 6.83 | 6.95 | 7.41 | 6.82 | 9.84 | 7.91 | 7.23 | 6.64 | 7.3 |
| 7.81 | 7.19 | 6.63 | 6 | 6.65 | 5.84 | 5.87 | 6.15 | 6.53 | 7.62 |
| 6.9 | 6.2 | 8.08 | 6.47 | 7.2 | 5.86 | 7.69 | 6.55 | 6.94 | 7.01 |
| 7.78 | 6.98 | 7.55 | 6.56 | 5.92 | 6.17 | 7.05 | 6.73 | 7.65 | 8.09 |

TABLE 6

The training samples of real effluent TN (mg/L)

| | | | | | | | | | |
|---|---|---|---|---|---|---|---|---|---|
| 75.3 | 86 | 91.3 | 91.8 | 88.5 | 83.9 | 84.8 | 82.1 | 80 | 84.4 |
| 80 | 89.6 | 79.9 | 82.2 | 77.6 | 55.5 | 85.1 | 85.4 | 90.4 | 84.2 |
| 80.9 | 76.1 | 73.7 | 86.6 | 83.1 | 85.9 | 81.7 | 79.6 | 72 | 78 |
| 79.3 | 81.77 | 73.7 | 62.4 | 73.2 | 70.7 | 72.2 | 71.1 | 63 | 75.3 |
| 81.8 | 72.7 | 88.9 | 77.4 | 74.1 | 71.2 | 80.5 | 76.5 | 75.8 | 82.6 |
| 80.1 | 70.3 | 86.5 | 71.5 | 67.9 | 65.6 | 68.6 | 70.9 | 77.4 | 87.2 |

TABLE 7

The effluent TN concentration outputs in the training process (mg/L)

| | | | | | | | | | |
|---|---|---|---|---|---|---|---|---|---|
| 75.09123 | 85.75465 | 91.29607 | 91.6917 | 88.23302 | 83.95164 | 85.46349 | 82.11712 | 79.64609 | 84.5503 |
| 79.87456 | 89.64711 | 79.92864 | 81.83561 | 77.36899 | 57.73073 | 84.80773 | 85.69525 | 90.44198 | 82.75301 |
| 81.46583 | 76.12251 | 73.87198 | 86.63506 | 82.91107 | 85.88516 | 81.91191 | 79.37446 | 72.01563 | 78.18965 |
| 79.34218 | 81.66961 | 73.74434 | 62.82255 | 73.0666 | 70.48056 | 72.29508 | 71.25872 | 63.62556 | 74.98458 |
| 81.483 | 72.48675 | 88.93721 | 77.31496 | 74.22315 | 70.59969 | 80.91807 | 76.37911 | 75.78082 | 82.65934 |
| 80.05047 | 71.01168 | 85.82914 | 71.58082 | 67.73245 | 65.72093 | 69.74704 | 69.91498 | 76.98607 | 87.36917 |

Testing Samples

TABLE 8

The testing samples of biochemical oxygen demand-BOD (mg/L)

| | | | | | | | | | |
|---|---|---|---|---|---|---|---|---|---|
| 217 | 226 | 218 | 390 | 260 | 200 | 248 | 370 | 342 | 347 |
| 290 | 440 | 289 | 460 | 188 | 318 | 334 | 290 | 341 | 335 |
| 287 | 346 | 266 | 430 | 294 | 450 | 262 | 372 | 370 | 198 |
| 347 | 610 | 326 | 283 | 395 | 233 | 331 | 209 | 282 | 174 |

TABLE 9

The testing samples of ammonia nitrogen-NH4—N (mg/L)

| | | | | | | | | | |
|---|---|---|---|---|---|---|---|---|---|
| 48.6 | 56.9 | 64.2 | 58.9 | 50.3 | 61.3 | 63.7 | 68.6 | 54 | 40.8 |
| 53.4 | 60.2 | 66.4 | 60.9 | 63.4 | 54.4 | 40.7 | 69 | 63.4 | 55 |
| 66.3 | 63.2 | 62.3 | 52.7 | 60.5 | 57 | 62.1 | 68.2 | 64 | 69 |
| 67.2 | 61.5 | 66 | 64.5 | 62.1 | 51.4 | 51 | 55.5 | 55.5 | 58.5 |

TABLE 10

The testing samples of nitrate nitrogen-NO3—N (mg/L)

| | | | | | | | | | |
|---|---|---|---|---|---|---|---|---|---|
| 12.3085 | 12.6792 | 13.0400 | 13.2389 | 13.5262 | 13.4614 | 13.2849 | 12.9682 | 12.7089 | 12.2269 |
| 12.0995 | 12.1315 | 12.1361 | 12.2122 | 12.2197 | 12.3499 | 12.4464 | 12.4927 | 12.7326 | 12.8156 |
| 12.9392 | 13.0438 | 13.7367 | 14.1627 | 14.8751 | 15.9604 | 16.7487 | 17.6572 | 18.6773 | 19.1970 |
| 19.9069 | 20.5030 | 20.9495 | 21.3475 | 21.8734 | 22.4720 | 22.7922 | 23.2325 | 23.4924 | 23.2459 |

TABLE 11

The testing samples of effluent suspended solids-SS (mg/L)

| | | | | | | | | | |
|---|---|---|---|---|---|---|---|---|---|
| 154 | 158 | 214 | 204 | 110 | 232 | 226 | 254 | 122 | 538 |
| 130 | 162 | 142 | 360 | 376 | 231.2 | 166 | 118 | 142 | 220 |
| 266 | 172 | 296 | 235 | 180 | 146 | 206 | 208 | 202 | 146 |
| 398 | 270 | 328 | 126 | 244 | 218 | 272 | 168 | 262 | 110 |

TABLE 12

The testing samples of total phosphorus-TP (mg/L)

| | | | | | | | | | |
|---|---|---|---|---|---|---|---|---|---|
| 5.17 | 5.39 | 6.03 | 5.96 | 5.24 | 6.22 | 5.78 | 6.17 | 5.6 | 5.22 |
| 4.75 | 5.46 | 6.1 | 6.48 | 6.84 | 5.5 | 4.06 | 5.74 | 5.73 | 5.8 |
| 6.71 | 5.63 | 6.18 | 5.11 | 5.03 | 4.6 | 5.24 | 5.86 | 5.62 | 6.13 |
| 7.01 | 6.11 | 6.65 | 5.56 | 6.52 | 6.22 | 6.25 | 5.2 | 5.77 | 6.17 |

TABLE 13

The testing samples of real effluent TN (mg/L)

| | | | | | | | | | |
|---|---|---|---|---|---|---|---|---|---|
| 62.8 | 67.4 | 75.3 | 70.1 | 59.4 | 78.5 | 75.4 | 77.3 | 70.2 | 54.5 |
| 60.7 | 66.7 | 74.1 | 74.9 | 78.6 | 66 | 60.9 | 65.4 | 52.3 | 60.5 |
| 72.7 | 68.2 | 70 | 65.1 | 69.1 | 61.9 | 69.3 | 71.5 | 70.7 | 76.7 |
| 80.8 | 73.9 | 77.3 | 73.5 | 76.3 | 73.4 | 74.1 | 64.5 | 66.6 | 67.8 |

TABLE 14

The effluent TN concentration outputs in the testing process (mg/L)

| | | | | | | | | | |
|---|---|---|---|---|---|---|---|---|---|
| 60.43193 | 67.16412 | 75.34496 | 70.96676 | 63.11076 | 67.66785 | 81.3452 | 79.78831 | 64.06407 | 58.64447 |
| 63.99991 | 66.24501 | 72.44785 | 72.43734 | 77.82645 | 67.75635 | 57.96904 | 75.32191 | 63.95107 | 56.05289 |
| 62.8231 | 65.67208 | 71.03243 | 61.22433 | 66.2433 | 65.8583 | 68.8428 | 76.71578 | 67.04345 | 74.80853 |
| 78.61247 | 75.88474 | 80.21718 | 68.98426 | 77.51966 | 67.57056 | 73.42719 | 71.17669 | 65.88281 | 66.41494 |

What is claimed is:

1. A method of detecting the effluent total nitrogen (TN) concentration based on a recurrent self-organizing radial basis function (RBF) neural network (RSORBFNN), the method comprising:

(1) determining input and output variables of the effluent TN concentration with respect to a sewage treatment process of an activated sludge system by analyzing the variables of the sewage treatment process and selecting the input variables of the effluent TN concentration computing model that include: ammonia nitrogen ($NH_4$—N), nitrate nitrogen ($NO_3$—N), effluent suspended solids (SS), biochemical oxygen demand (BOD), total phosphorus (TP), an output value of the computing model is detected effluent TN concentration;

(2) initializing the RSORBFNN of which an initial structure comprises three layers: input layer, hidden layer, and output layer, there are 5 neurons in the input layer, J neurons in the hidden layer, and 1 neuron in the output layer, J>2 is a positive integer, connection weights between the input layer and hidden layer are assigned 1, feedback weights between hidden layer and output layer are randomly assigned with values, an assignment internal is −1 to 1; the number of the training sample is P, and an input vector of the RSORBFNN is $x(t)=[x_1(t), x_2(t), x_3(t), x_4(t), x_5(t)]$ at time t; y(t) is an output of the RSORBFNN, and $y_d(t)$ is a real value of the effluent TN concentration at time t, respectively; the output of the RSORBFNN is described using the equation (1):

$$y(t) = \sum_{j=1}^{J} w_j^2(t)\theta_j(t), \quad (1)$$

wherein w2j(t) is the output weight between the jth hidden neuron and the output neuron, $w^2(t)=[w2\,1(t), w2\,2(t), \ldots, w2\,J(t)]^T$ is the output weight vector between hidden neurons and output neuron, j=1, 2, ..., J, J is the number of hidden neurons, and $\theta_j(t)$ is the output value of the jth hidden neuron which is defined by a normalized Gaussian function (2):

$$\theta_j(t) = e^{-\|h_j(t)-c_j(t)\|^2/2\sigma_j^2(t)}, \quad (2)$$

wherein $\|h_j-c_j\|$ represents the Euclidean distance between $h_j$ and $c_j$, $c_j(t)=[c_{1j}(t), c_{2j}(t), \ldots, c_{5j}(t)]^T$ and $\sigma_j$ represent the center vector and radius of the jth hidden neuron, respectively; $c_{ij}(t)$ is ith element of jth hidden neuron and $h_j$ is the input vector of jth hidden neuron using the equation (3):

$$h_j(t)=[u_1(t),u_2(t),u_3(t),u_4(t),u_5(t),w_j^1(t)\times y(t-1)] \quad (3)$$

wherein y(t−1) is the output from RSORBFNN at (t−1) time, w1 j(t) is the feedback weight connecting the jth neuron in the hidden layer hidden with the output neuron, $w^1(t)=[w1\,1(t), w1\,2(t), \ldots, w1\,J(t)]^T$ is the feedback weight between the output neuron and the hidden layer neuron, T means to transpose;

the output of the output layer is:

$$y(t) = \sum_{j=1}^{J} w_j^2(t) \times \theta_j(t), \quad j=1, \ldots, J \quad (4)$$

wherein $w^2(t)=[w2\,1(t), w2\,2(t), \ldots, w2\,J(t)]^T$ is the weight vector connecting the hidden layer and the output layer at time t, w2j(t) is the weight connecting the hidden layer and the output layer at time t, $\theta(t)=[\vartheta_1(t), \vartheta_2(t), \ldots, \vartheta_j(t)]^T$ is the output vector of the hidden layer at time t, $\vartheta_j(t)$ is the output of the hidden layer neuron j at time t, and y(t) is the output of the RSORBFNN at time t;

a training error function of RSORBFNN is defined using the equation (5):

$$E(t) = \frac{1}{P}\sum_{t=1}^{P}(y_d(t)-y(t))^2, \quad (5)$$

wherein P is the number of the training samples;

(3) training the RSORBFNN by:

1) assigning for the RSORBFNN an initial number of hidden layer neurons using J, J>2 is a positive integer, the input of RSORBFNN is x(1), x(2), ..., x(t), ..., x(P), the desired output is $y_d(1), y_d(2), \ldots, y_d(t), \ldots, y_d(P)$; the desired error value is set to $E_d$, $E_dE(0, 0.01)$, the initial center is $c_j(1) \in (-2, 2)$, the initial width value $\sigma_j(1) \in (0, 1)$, the initial feedback weight is w1 j(1)∈(0, 1), and the initial weight is w2j(1)∈(0, 1), j=1, 2, ..., J;

2) setting a learning step s=1;

3) in response to t=s, calculating the output y(t) of the RSORBFNN, updating the weight, width, and center of RSORBFNN using the rule (6):

$$\Theta(t+1)=\Theta(t)+(\Psi(t)+\eta(t)\times I)^{-1}\times\Omega(t), \quad (6)$$

where $\Theta(t)=[w^1(t),w^2(t),C(t),\sigma(t)]$ is the variable vector at time t, ψ(t) is quasi Hessian matrix at time t, I is the identity matrix, η(t) is the adaptive learning rate defined by the equations (7) and (8):

$$\eta(t) = \mu(t)\eta(t-1), \quad (7)$$

$$\mu(t) = \frac{(\beta^{max}(t)+\eta(t-1))/(1+\beta^{max}(t-1))-\beta^{min}(t-1)}{\eta(t-1)}, \quad (8)$$

wherein μ(t) is the adapting factor at time t, and the initial value of μ(t) is μ(1)=1, $\beta^{max}(t)$ and $\beta^{min}(t)$ are the maximum and minimum eigenvalues of ψ(t), respectively; $0<\beta^{min}(t)<\beta^{max}(t)$, $0<\eta(t)<1$ and $\eta(1)=1$; $\Theta(t)$ contains four kinds of variables: the feedback connection weight vector $w^1(t)$ at time t, the connection weight vector $w^2(t)$ at time t, the centre matrix $C(t)=[c_1(t), c_2(t), \ldots, c_J(t)]^T$ and width vector $\sigma(t)=[\sigma_1(t), \sigma_2(t), \ldots, \sigma_J(t)]^T$ at time t, wherein $$\Theta(1)=[w^1(1), w^2(1), C(1), \sigma(1)], \quad (9)$$

the quasi Hessian matrix $\psi(t)$ and the gradient vector $\Omega(t)$ are accumulated as the sum of related submatrices and vectors:

$$\Psi(t)=j^T(t)j(t), \quad (10)$$

$$\Omega(t)=j^T e(t), \quad (11)$$

$$e(t)=y_d(t)-y(t), \quad (12)$$

e(t) is the approximating error at time t, $y_d(t)$ is the desired output and y(t) is the network output at time t, and the Jacobian-vector j(t) is calculated by the equation (13):

$$j(t) = \left[ \frac{\partial e(t)}{\partial w^1(t)}, \frac{\partial e(t)}{\partial w^2(t)}, \frac{\partial e(t)}{\partial C(t)}, \frac{\partial e(t)}{\partial \sigma(t)} \right], \quad (13)$$

4) in response to t>3, calculating competitiveness of the jth hidden neuron using the equation (14):

$$cp_j(t)=\rho f_j(t)\sigma_j(t), j=1,2,\ldots,J, \quad (14)$$

wherein $cp_j(t)$ is the competitiveness of the jth hidden neuron, $\rho$ denotes the correlation coefficient between the hidden layer output and network output, $\rho \in (0, 1)$, $f_j(t)$ is the active state of the jth hidden neuron, $\sigma_j(t)$ is the width of the jth hidden neuron; the active state $f_j(t)$ is defined by the equation (15):

$$f_j(t)=\chi^{-\nu h j(t) - e_j(t)\|}, \quad (15)$$

wherein $\chi \in (1,2)$, and $f(t)=[f_1(t), f_2(t), \ldots, f_J(t)]$, the correlation coefficient $\rho_j(t)$ at time t is calculated as the equation (16):

$$\rho_j(t) = \frac{\sum_{k=0}^{3}[A_j(t-k)-\overline{A}(t)][B(t-k)-\overline{B}(t)]}{\sqrt{\sum_{k=0}^{3}[A_j(t-k)-\overline{A}(t)]^2 \sum_{k=0}^{3}[B(t-k)-\overline{B}(t)]^2}}, \quad (16)$$

wherein the correlation coefficient of hidden neurons $A_j(t)=w2\ j(t)\ \theta_j(t)$, the correlation coefficient of output layer $B(t)=y(t)$, $\overline{A}(t)$ is the average value of correlation coefficient of hidden neurons at time t, $\overline{B}(t)$ is the average value of correlation coefficient of output layer at time t;

5) adjusting the structure of RSORBFNN:

if the competitiveness of the jth hidden neuron and training error at time t and t+τ satisfy the equations (17) and (18):

$$E(t) - E(t + \tau) \le \varepsilon, \quad (17)$$

$$j = \arg\max_{1 \le j \le J}(cp_j(t)), \quad (18)$$

wherein $$\arg\max_{1 \le j \le J}(cp_j(t))$$

denotes the value of j when $cp_j(t)$ owns the maximum value; E(t) and E(t+τ) are the training error at time t and t+τ, respectively, τ is a time interval, τ>2, and ε is the preset threshold, $\varepsilon \in (0, 0.01)$; add one hidden neuron, and the number of hidden neurons is $M_1=J+1$, or the structure of RSORBFNN is adjusted, $M_1=J$, when the competitiveness of the jth hidden neuron satisfies the equation (19):

$$cp_j(t)<\xi \quad (19)$$

wherein ξ is the preset pruning threshold, $\xi \in (0, E_d)$, $E_d$ is the preset error, $E_d \in (0.001]$, the jth hidden neuron is pruned, and the number of hidden neurons is updated $M_2=M_1-1$, or the structure of RSORBFNN is adjusted, $M_2=M_1$;

6) Increasing a learning step for s, if s<P, go to step 3); if s=N, go to step 7); and 7) according to equation (5), calculate the performance of the RSORBFNN, if $E(t) \ge E_d$, performing step 3); if $E(t)<E_d$, terminating the training process; and (4) predicting the effluent TN concentration using the testing samples as the input of the RSORBFNN to obtain the output of the RSORBFNN as computing values of the effluent TN concentration.

* * * * *